United States Patent
Hsu et al.

(10) Patent No.: US 10,551,499 B2
(45) Date of Patent: Feb. 4, 2020

(54) OPTICAL DETECTING DEVICE CAPABLE OF INCREASING SIGNAL-TO-NOISE RATIO AND ECONOMIZING POWER CONSUMPTION

(71) Applicant: PixArt Imaging Inc., Hsin-Chu (TW)

(72) Inventors: En-Feng Hsu, Hsin-Chu (TW); Yung-Song Hou, Hsin-Chu (TW); Hsin-Chi Cheng, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 361 days.

(21) Appl. No.: 14/967,385

(22) Filed: Dec. 14, 2015

(65) Prior Publication Data

US 2017/0045396 A1 Feb. 16, 2017

(30) Foreign Application Priority Data

Aug. 12, 2015 (TW) .............................. 104126190 A (51) Int. Cl.

| G01J 1/44 | (2006.01) |
|---|---|
| G01S 17/02 | (2006.01) |
| G06F 3/042 | (2006.01) |
| G01S 7/481 | (2006.01) |
| G06F 3/03 | (2006.01) |

(52) U.S. Cl.
CPC .......... *G01S 17/026* (2013.01); *G01S 7/4813* (2013.01); *G01S 7/4814* (2013.01); *G01S 7/4816* (2013.01); *G06F 3/0325* (2013.01); *G06F 3/0421* (2013.01)

(58) Field of Classification Search
CPC .... G01S 17/026; G01S 7/4813; G01S 7/4814; G01S 7/4816; G06F 3/0325; G06F 3/0421

USPC .................................................. 250/206, 226
See application file for complete search history.

(56) References Cited

U.S. PATENT DOCUMENTS

| 2003/0090650 | A1* | 5/2003 | Fujieda | G06K 9/0004 356/71 |
|---|---|---|---|---|
| 2007/0257272 | A1* | 11/2007 | Hutchins | H01L 25/0753 257/98 |
| 2008/0142686 | A1* | 6/2008 | Konno | H01L 27/14632 250/208.1 |
| 2008/0198138 | A1* | 8/2008 | McFarlane | G06F 3/0421 345/173 |
| 2010/0217102 | A1* | 8/2010 | LeBoeuf | A61B 5/00 600/310 |
| 2012/0037794 | A1* | 2/2012 | Lee | G01S 17/026 250/216 |

(Continued)

*Primary Examiner* — Georgia Y Epps
(74) *Attorney, Agent, or Firm* — Winston Hsu (57) ABSTRACT

An optical detecting device capable of increasing signal-to-noise ratio (SNR) and economizing power consumption is installed on a wearable device. The optical detecting device includes a base, an optical detecting component and a light emitting module. The optical detecting component is disposed on the base and has a detecting surface normal vector. The light emitting module is disposed on the base and outputs a sampling signal to project onto an external object, and the optical detecting component can receive the sampling signal reflected from the external object. The light emitting module is slanted toward the optical detecting component, and an optical axis of spatial distribution of the sampling signal and the detecting surface normal vector are crossed to form a deviated angle.

18 Claims, 8 Drawing Sheets

(56) References Cited

U.S. PATENT DOCUMENTS

| | | | |
|---|---|---|---|
| 2013/0211204 A1* | 8/2013 | Caduff | A61B 5/01 600/300 |
| 2013/0266256 A1* | 10/2013 | Ray | H03K 17/9631 385/16 |
| 2013/0270581 A1* | 10/2013 | Lowes | H01L 33/48 257/88 |
| 2015/0311376 A1* | 10/2015 | Yu | H01L 31/02327 257/432 |

* cited by examiner

OPTICAL DETECTING DEVICE CAPABLE OF INCREASING SIGNAL-TO-NOISE RATIO AND ECONOMIZING POWER CONSUMPTION

BACKGROUND OF THE INVENTION

1. Field of the Invention

The present invention relates to an optical detecting device, and more particularly, to an optical detecting device capable of crossing the sampling optical axis over the detecting surface normal vector to increase the signal-to-noise ratio.

2. Description of the Prior Art

Figure 8:
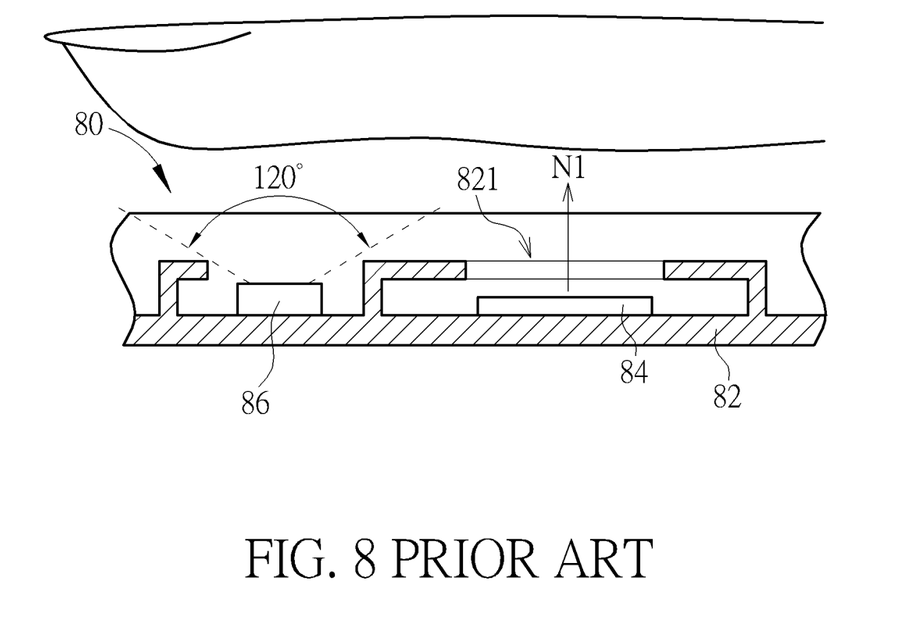
FIG. 8 is a diagram of an optical detecting device 80 in prior art.

Please refer to FIG. 8. FIG. 8 is a diagram of an optical detecting device 80 in prior art. The optical detecting device 80 includes a base 80, an optical detecting component 84 and a light emitting unit 86. The optical detecting component 84 and the light emitting unit 86 are disposed on the same plane of the base 82, and a detecting surface normal vector of the optical detecting component 84 and a sampling optical axis of the light emitting unit 86 are parallel to a planar normal vector of the base 82. Because the sampling optical axis of the light emitting unit 86 does not point to a touch plane 821 of the base 82, the sampling single output by the light emitting unit 86 and reflected from the external object (such as the user's finger) cannot be completely received by the optical detecting component 84 even through the sampling single is projected onto the external object. The optical detecting component 84 may merely receive 60-70 percent of the reflected sampling signal from the external object, which results in low signal-to-noise ratio (SNR) and power consumption. Therefore, design of an optical detecting device capable of providing preferred reception efficiency of the optical detecting component is an important issue in the related industry.

SUMMARY OF THE INVENTION

The present invention provides an optical detecting device capable of crossing the sampling optical axis over the detecting surface normal vector to increase signal-to-noise ratio for solving above drawbacks.

According to the claimed invention, an optical detecting device capable of increasing signal-to-noise ratio (SNR) and economizing power consumption is applied to a wearable device. The optical detecting device includes a base, an optical detecting component and a light emitting module. The optical detecting component is disposed on the base, and has a detecting surface normal vector. The light emitting module is disposed on the base. The light emitting module is adapted to output a sampling signal to project onto an external object, and the optical detecting component is adapted to receive the sampling signal reflected from the external object. The light emitting module is slanted toward the optical detecting component to cross an optical axis of spatial distribution of the sampling signal over the detecting surface normal vector and to form a deviated angle. The base includes a touch plane, the external object is disposed on the touch plane to reflect the sampling signal, the optical axis is not parallel to a touch plane normal vector of the base and points toward a central region of the touch plane. The deviated angle of the optical axis relative to the detecting surface normal vector is ranged between 5 degrees and 40 degrees.

According to the claimed invention, the light emitting module includes a light emitting unit and an optical modulating component. The optical modulating component is disposed on the light emitting unit and adapted to deviate an emitting direction of the light emitting unit toward the optical detecting component. The luminous angle of the light emitting unit narrowed by the optical modulating component is substantially ranged between 20 degrees and 90 degrees.

According to the claimed invention, the optical modulating component is a light guiding component, or includes a plurality of micro-prism units.

According to the claimed invention, the optical modulating component is a symmetric optical lens, the light emitting unit is partially under a region of the symmetric optical lens to narrow a luminous angle of the light emitting unit. The symmetric optical lens is divided into two regions having substantially symmetrical dimensions via a central axle, and the light emitting unit is disposed on one of the two regions adjacent to the optical detecting component.

According to the claimed invention, the optical modulating component is an asymmetric optical lens disposed on the light emitting unit to narrow a luminous angle of the light emitting unit. The asymmetric optical lens includes a lateral surface, an incident surface and an emergent surface, and a reflective layer is disposed on the lateral surface.

According to the claimed invention, the light emitting module includes a light emitting unit and a supporting component. The light emitting unit is disposed on the supporting component, and a supporting surface normal vector of the supporting component is crossed over the detecting surface normal vector. The light emitting module further includes an optical modulating component disposed on the light emitting unit to deviate an emitting direction of the light emitting unit.

According to the claimed invention, the optical detecting device further includes a holding component adapted to obliquely hold the optical detecting component, so as to cross the detecting surface normal vector over the optical axis of the light emitting module.

According to the claimed invention, the optical detecting device further includes more than one light emitting module. The foresaid light emitting modules are respectively disposed on opposite sides of the optical detecting component, and optical axes of the foresaid light emitting modules are slanted to each other.

The optical detecting device of the present invention projects the sampling signal of the light emitting module centrally onto the center of the touch plane, not only can decrease intensity of the sampling signal for energy conservation, but also prevent the power consumption due to the sampling signal projected onto a region outside of the touch plane. The SNR of the optical detecting device can be increased accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
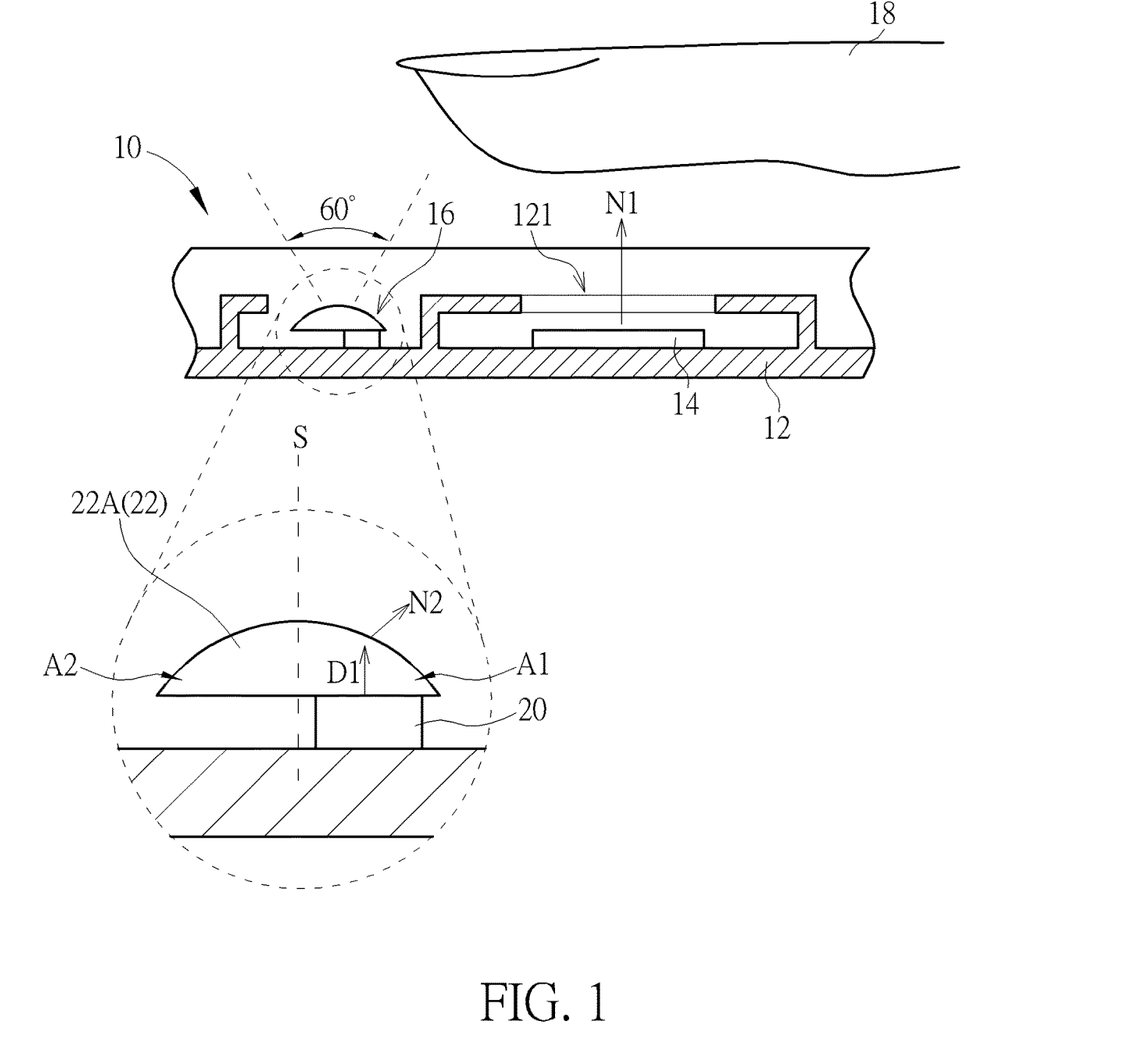
FIG. 1 is a diagram of an optical detecting device according to a first embodiment of the present invention.
Figure 2:
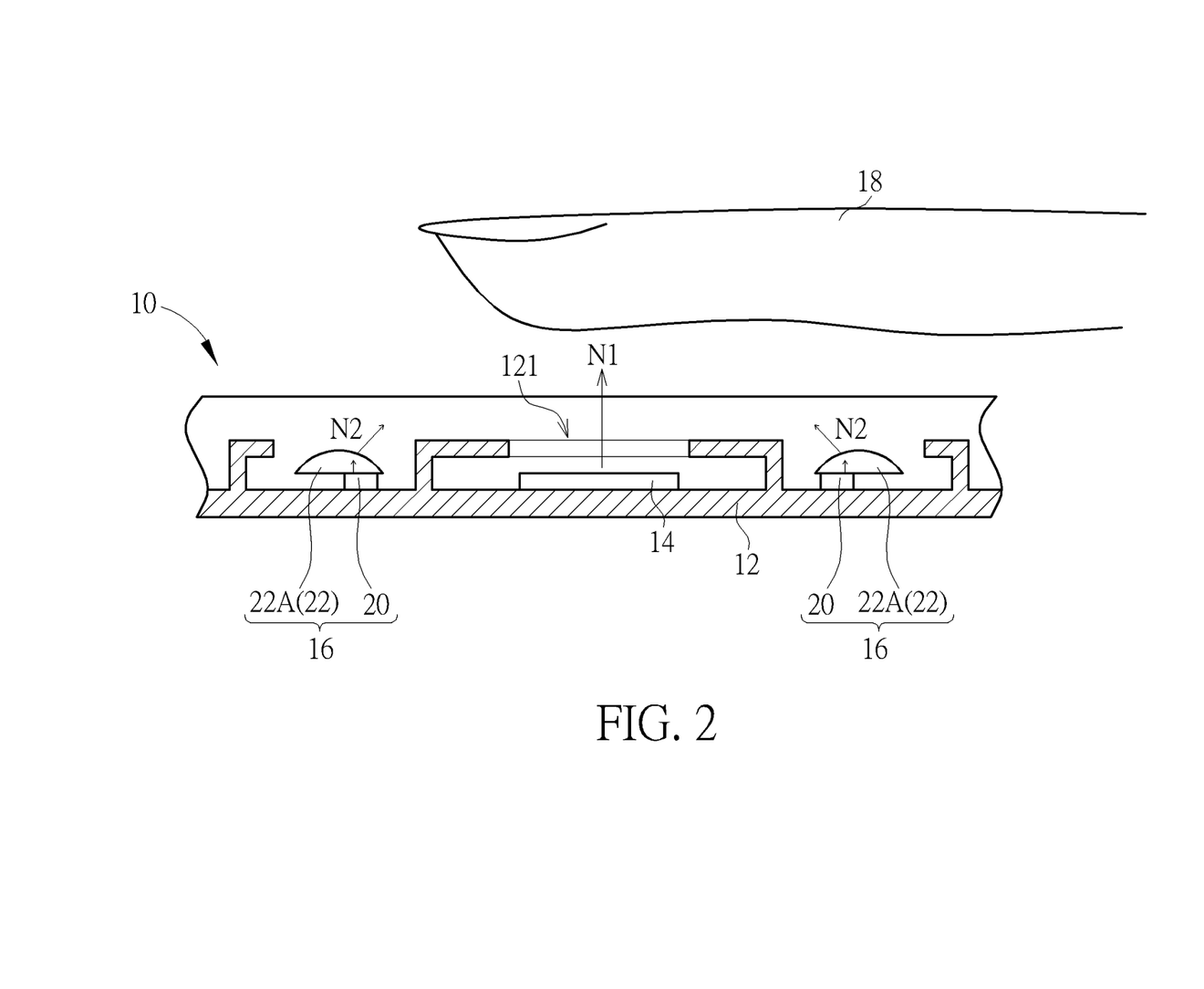
FIG. 2 is a diagram of the optical detecting device according to a second embodiment of the present invention.

Please refer to FIG. 1 and FIG. 2. FIG. 1 is a diagram of an optical detecting device 10 according to a first embodiment of the present invention. FIG. 2 is a diagram of the optical detecting device 10 according to a second embodiment of the present invention. The optical detecting device 10 can be optionally disposed on the wearable device, such as the mobile phone or the smart wristband, to detect biological characteristic information (such like heartbeat) and provide advantages of high signal-to-noise ratio (SNR) and low power consumption. The optical detecting device 10 includes a base 12, an optical detecting component 14 and a light emitting module 16. The base 12 can be, but not limited, a part of the housing of the portable device. The optical detecting component 14 is a receiver for receiving visible light or invisible light. Generally, a flat surface of the base 12 is utilized to hold the optical detecting component 14. The optical detecting component 14 includes a plurality of detecting units arranged as an array to form a detecting surface. The optical detecting component 14 has a detecting surface normal vector N1, and the detecting surface normal vector N1 is substantially parallel to a planar normal vector of the base 12.

An amount of the light emitting module 16 can be one or more. The single light emitting module 16 is disposed on a side of the optical detecting component 14 of the base 12. The plurality of light emitting modules 16 is symmetrically disposed on opposite sides of the optical detecting component 14. Arrangement of the light emitting module 16 is designed according to actual demand. While the external object 18 (such as fingers of the user) is put on a touch plane 121 of the base 12, a sampling signal (the visible light or the invisible light) output by the light emitting module 16 can be projected onto the external object 18, and then the optical detecting component 14 receives the sampling signal reflected from the external object 18. The biological characteristic information of the user can be acquired by analyzing optical property variation of the reflected sampling signal.

In the first embodiment, the optical detecting device 10 disposes the light emitting module 16 on the base 12. The light emitting module 16 includes a light emitting unit 20 and an optical modulating component 22A. The light emitting unit 20 can be a light emitting diode (LED), and an original luminous angle (which means light scattering range) equals 120 degrees substantially. The optical modulating component 22A can be a symmetric optical lens with any shape. The optical modulating component 22A (symmetric optical lens) is divided into two regions A1, A2 which have symmetrical dimensions via a central axle S. The optical modulating component 22A (symmetric optical lens) is disposed above the light emitting unit 20, and the light emitting unit 20 is located under the region A1 of the optical modulating component 22A (symmetric optical lens) adjacent to the optical detecting component 14. As shown in FIG. 1, the optical modulating component 22A (symmetric optical lens) not only converges the luminous angle of the light emitting unit 20 into a range between 20-90 degrees, but also deviates the sampling signal of the light emitting unit 20 from an emitting direction D1 into an optical axis N2 to be slanted toward the optical detecting component 14. Thus, the detecting surface normal vector N1 is crossed over the optical axis N2 of spatial distribution of the sampling signal to form a deviated angle. The deviated angle of the optical axis N2 relative to the detecting surface normal vector N1 (or relative to the emitting direction D1) is preferably ranged between 5 degrees and 40 degrees.

It should be mentioned that the emitting direction D1 can be defined as a geometric axis of the light emitting unit 20. The geometric axis represents the central axle of the light emitting unit 20. While the light emitting unit 20 and the optical detecting component 14 are disposed on the same flat surface of the base 12, the emitting direction D1 is substantially parallel to the detecting surface normal vector N1. The luminous angle of the light emitting unit 20 can be narrowed from 120 degrees to the range between 20-90 degrees while the sampling signal is modulated by the optical modulating component 22A, and the optical axis N2 can be represented as the symmetrical axis of the modulated spatial distribution (the luminous angle ranged between 20-90 degrees). The sampling signal of the light emitting unit 20 can be deviated by the optical modulating component 22A, so as to slant the optical axis N2 of the light emitting module 16 toward a center of the touch plane 121, which means the optical axis N2 is not parallel to the detecting surface normal vector N1 and the touch plane normal vector of the touch plane 121.

Difference between the first and the second embodiments is: the optical detecting device 10 of the second embodiment includes two light emitting modules 16 respectively disposed on opposite sides of the optical detecting component 14. Each of the two light emitting modules 16 includes the light emitting unit 20 and the optical modulating component 22A, and the optical modulating component 22A is disposed above the light emitting unit 20 in misalign arrangement as described in the first embodiment. Therefore, the optical axes N2 of the two light emitting modules 16 are slanted to each other, and respectively point toward the center of the touch plane 121 to be crossed over the detecting surface normal vector N1 of the optical detecting component 14. The light emitting modules 16 of the first embodiment and the second embodiment utilize the optical modulating component 22A (symmetric optical lens) to converge and deviate the luminous angle and the emitting direction of the light emitting unit 20, so as to project the sampling signal of the light emitting unit 20 centrally onto an area (such like center of the touch plane 121) of the external object 18 close to the optical detecting component 14. The optical detecting device 10 can maintain preferred quality of the sampling signal even through the low-luminance sampling signal is applied, and further economize power consumption effectively.

Figure 3:
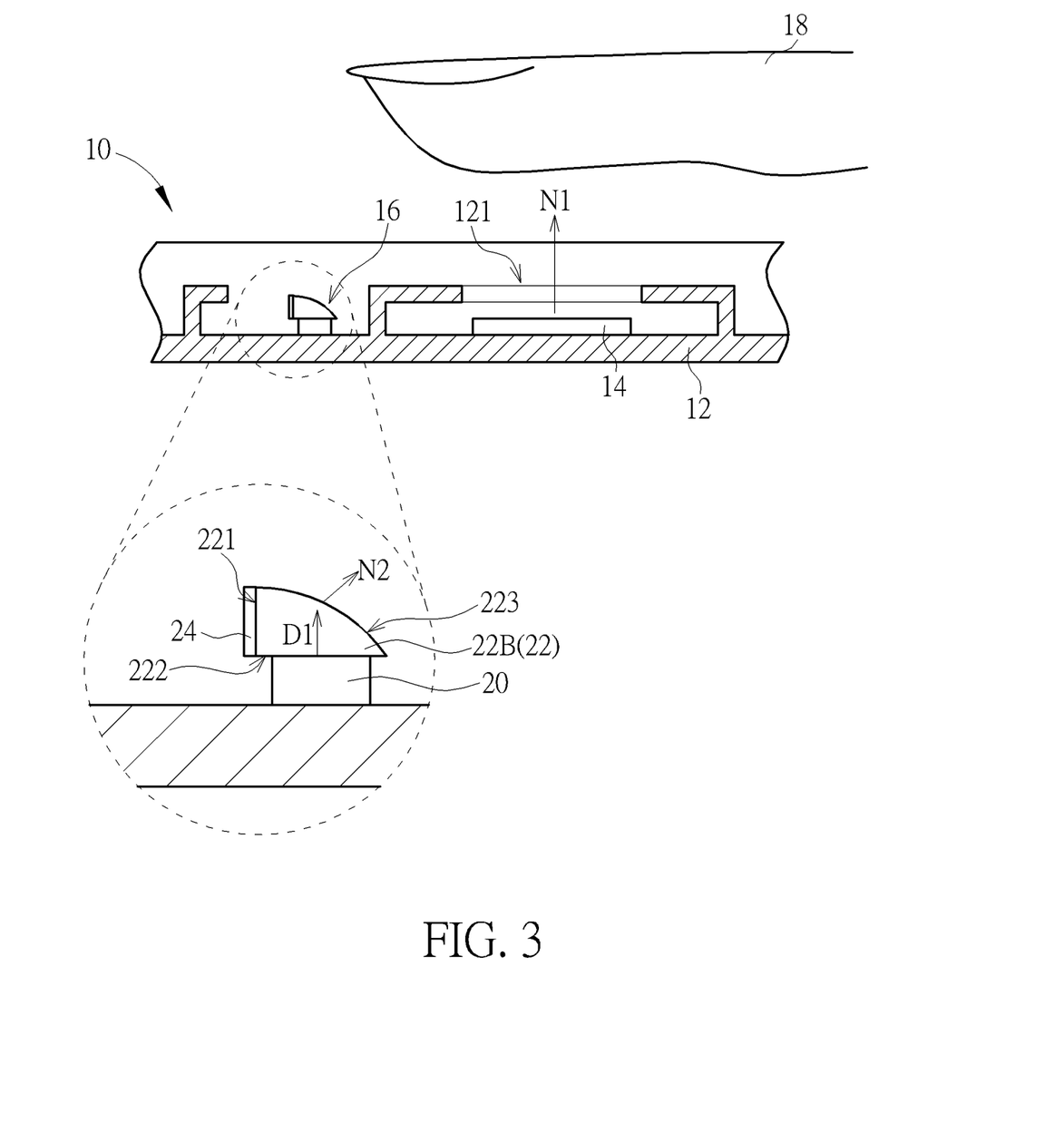
FIG. 3 is a diagram of the optical detecting device according to a third embodiment of the present invention.

Please refer to FIG. 3. FIG. 3 is a diagram of the optical detecting device 10 according to a third embodiment of the present invention. The optical detecting device 10 includes the base 12, the optical detecting component 14 and the light emitting module 16. In the third embodiment, the optical modulating component 22B of the light emitting module 16 can be an asymmetric optical lens with any shape. For example, the asymmetric optical lens of the third embodiment can be optionally formed by cutting the region A2 of the optical modulating component 22A (symmetric optical lens) described in the above-mentioned embodiments. As shown in FIG. 3, the optical modulating component 22B (asymmetric optical lens) includes a lateral surface 221, an incident surface 222 and an emergent surface 223 connected with each other. The incident surface 222 of the optical modulating component 22B (asymmetric optical lens) aligns with the light emitting unit 20. The sampling signal output by the light emitting unit 20 is transmitted into the optical modulating component 22B (asymmetric optical lens) through the incident surface 222 along the emitting direction D1, and is further emerged out of the optical modulating component 22B (asymmetric optical lens) via the emergent surface 223 to slant toward the optical axis N2. The optical modulating component 22B which is the asymmetrical convex lens can narrow the luminous angle of the light emitting unit 20. Moreover, the reflective layer 24 can be optionally disposed on the lateral surface 221, to prevent the sampling signal from transmitting out of the optical modulating component 22B (asymmetric optical lens) through the lateral surface 221 and to increase quantity of the sampling signal output by the light emitting module 16.

An amount of the light emitting module 16 in the third embodiment is not limited to the illustration shown in FIG. 3. For instance, the optical detecting device 10 may include two light emitting modules 16. The light emitting modules 16 include the optical modulating component 22 (which can be the symmetric optical lens or the asymmetric optical lens), and are respectively disposed on the opposite sides of the optical detecting component 14.

Figure 4:
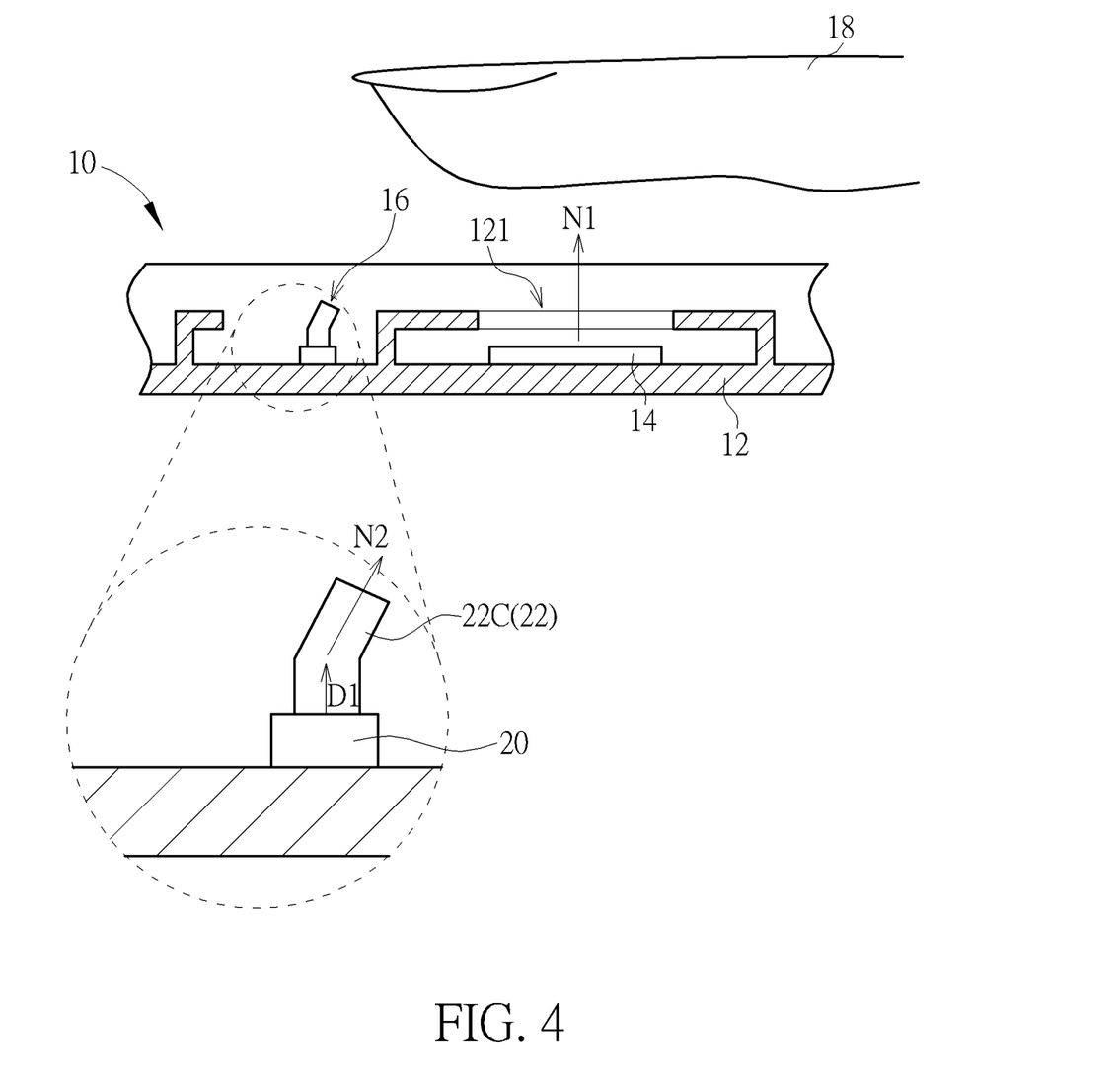
FIG. 4 is a diagram of the optical detecting device according to a fourth embodiment of the present invention.
Figure 5:
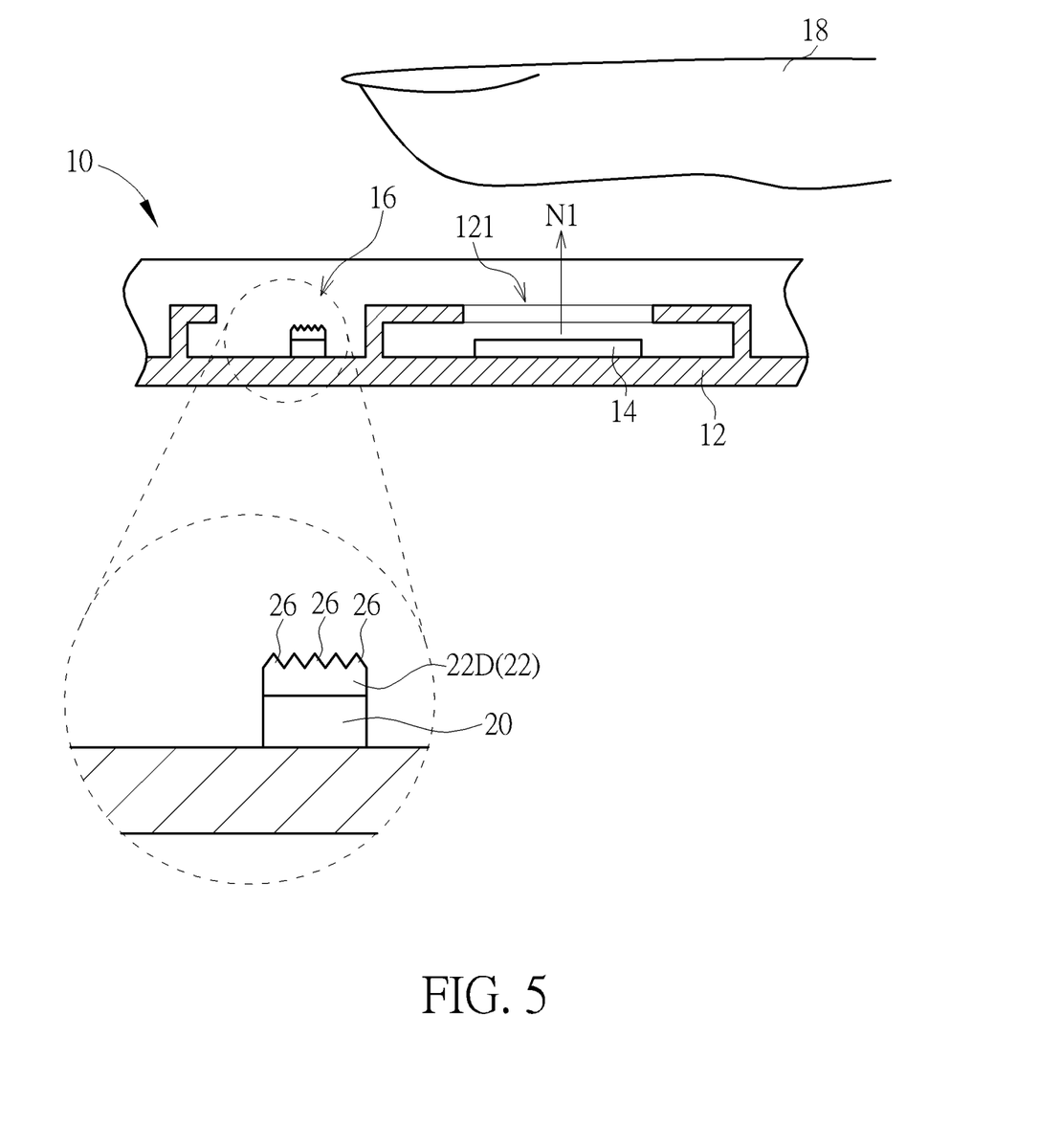
FIG. 5 is a diagram of the optical detecting device according to a fifth embodiment of the present invention.

Please refer to FIG. 4 and FIG. 5. FIG. 4 is a diagram of the optical detecting device 10 according to a fourth embodiment of the present invention. FIG. 5 is a diagram of the optical detecting device 10 according to a fifth embodiment of the present invention. The light emitting module 16 in the fourth embodiment mainly includes the light emitting unit 20 and the optical modulating component 22C. The optical modulating component 22C can be the light guiding component. The sampling signal output by the light emitting unit 20 can be transmitted into the optical modulating component 22C (the light guiding component) along the emitting direction D1, and further be projected onto the external object 18 along the optical axis N2 by light guiding function of the optical modulating component 22C; the optical axis N2 is slanted toward the detecting surface normal vector N1 to form the deviated angle. The light emitting module 16 in the fifth embodiment includes the light emitting unit 20 and the optical modulating component 22D, and a plurality of micro-prism units 26 is disposed on the emergent surface of the optical modulating component 22D. The micro-prism unit 26 is utilized to slant the sampling signal of the light emitting unit 20 from the emitting direction D1 toward the optical axis N2, so as to cross the symmetrical axis (which can be represented as the optical axis N2) of the sampling signal output by the light emitting module 16 over the detecting surface normal vector N1 to form the deviated angle.

In the fourth embodiment and the fifth embodiment, the optical modulating component 22 (which can be viewed as the optical modulating component 22C and the optical modulating component 22D) not only can slant the sampling signal from the emitting direction D1 to the optical axis N2, but also can narrow the luminous angle of the light emitting unit 20 by structural width variation of the optical modulating component 22. The structural width of the optical modulating component 22 is varied to control incident quantity and emerging margin of the sampling signal through the optical modulating component 22. An amount of the light emitting module 16 disposed inside the optical detecting device 10 is not limited to the fourth embodiment and the fifth embodiment, which depends on design demand. For example, the plurality of light emitting modules 16 can be respectively disposed on the opposite sides of the optical detecting component 14. Any light emitting module having the optical axis N2 slanted toward the optical detecting component 14 or pointing to the center of the touch plane 121 belongs to a scope of the present invention.

Figure 6:
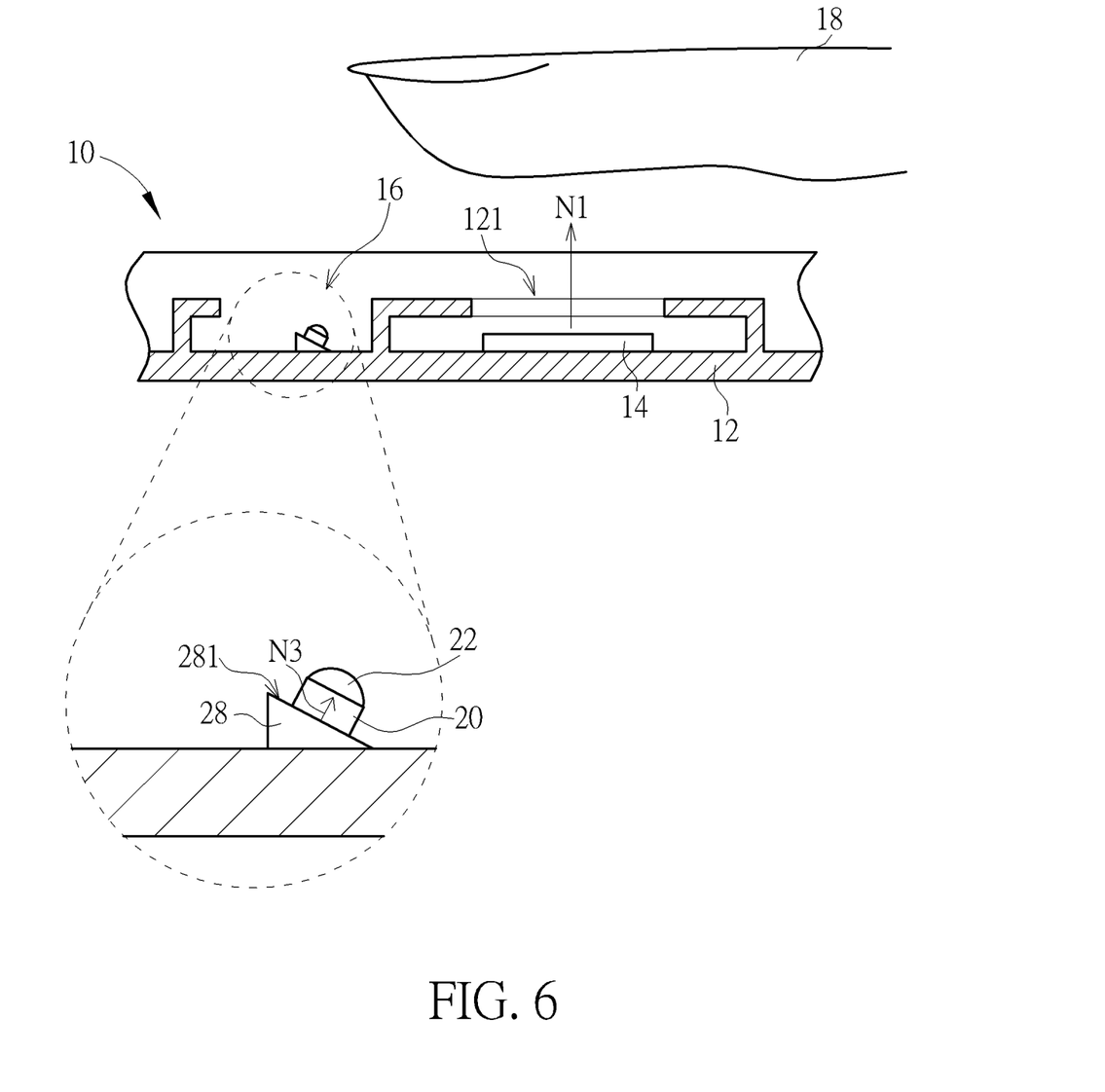
FIG. 6 is a diagram of the optical detecting device according to a sixth embodiment of the present invention.

Please refer to FIG. 6. FIG. 6 is a diagram of the optical detecting device 10 according to a sixth embodiment of the present invention. The light emitting module 16 in the sixth embodiment at least includes the light emitting unit 20 and a supporting component 28. The supporting component 28 has an inclined supporting surface 281, and a supporting surface normal vector N3 of the supporting surface 281 is crossed over the detecting surface normal vector N1. The light emitting unit 20 is disposed on the supporting surface 281 of the supporting component 28, so that the emitting direction D1 of the light emitting unit 20 and the optical axis N2 can be slanted toward the optical detecting component 14 and crossed over the detecting surface normal vector N1 to form the deviated angle. The sixth embodiment can optionally dispose the optical modulating component 22 above the light emitting unit 20, to narrow the luminous angle of the light emitting unit 20 and to deviate the emitting direction D1 of the light emitting unit 20. An amount of the light emitting module 16 is not limited to the embodiment shown in FIG. 6; for example, the plurality of light emitting modules 16 can be respectively disposed on the opposite sides of the optical detecting component 14. Any arrangement that the optical axis N2 of the light emitting module 16 is slanted toward the optical detecting component 14 by the supporting component 28 belongs to the scope of the present invention.

Figure 7:
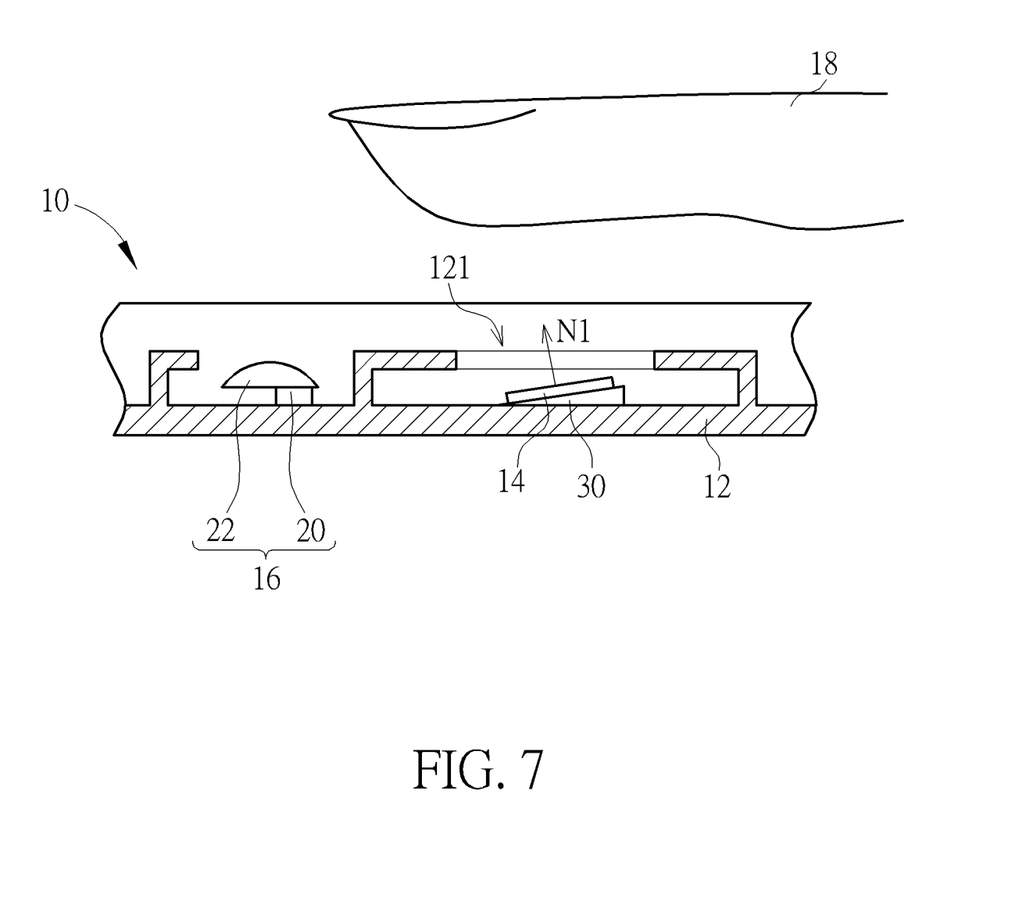
FIG. 7 is a diagram of the optical detecting device according to a seventh embodiment of the present invention.

Please refer to FIG. 7. FIG. 7 is a diagram of the optical detecting device 10 according to a seventh embodiment of the present invention. The optical detecting device 10 in the seventh embodiment includes the base 12, the optical detecting component 14, the light emitting module 16 and a holding component 30. The light emitting module 16 is disposed by the optical detecting component 14. The optical modulating component 22 of the light emitting module 16 can be the symmetric optical lens, the asymmetric optical lens, the light guiding component or the micro-prism structure according to the above-mentioned embodiments; or the light emitting module 16 merely includes the light emitting unit 20 without disposition of the optical modulating component 22 and/or the supporting component 28. The optical detecting component 14 of the seventh embodiment is disposed on the base 12 via the holding component 30. The holding component 30 is an inclined structure to obliquely hold the optical detecting component 14, so that the detecting surface normal vector N1 of the optical detecting component 14 can be slanted toward the light emitting module 16, so the detecting surface normal vector N1 is crossed over the optical axis N2 of the light emitting module 16 to form the deviated angle.

In conclusion, the present invention can dispose the optical modulating component above the light emitting unit, or dispose the supporting component under the light emitting unit, or dispose the holding component under the optical detecting component optionally, to increase signal-to-noise ratio (SNR) of the optical detecting device for economy of power consumption. The optical modulating component is utilized to narrow the luminous angle of the light emitting unit, so as to increase intensity of the sampling signal projected into the external object by the light emitting module and to deviate the sampling signal from the original emitting direction of the light emitting unit to the optical axis slanted toward the optical detecting component. The optical axis is crossed over the detecting surface normal vector, the sampling signal can be focused on the center of the touch plane, and the optical detecting device in low illumination can maintain preferred quality of the sampling signal for economy of the power consumption. Functions of the supporting component and the holding component are utilized to divert the optical axis of the light emitting module, and the optical modulating component is collocated optionally to achieve optimal effect.

Comparing to the prior art, the optical detecting device of the present invention projects the sampling signal of the light emitting module centrally onto the center of the touch plane, not only can decrease intensity of the sampling signal for energy conservation, but also prevent the power consumption due to the sampling signal projected onto a region outside of the touch plane. The SNR of the optical detecting device can be increased accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting device capable of increasing signal-to-noise ratio (SNR) and economizing power consumption to be applied to a wearable device, the optical detecting device comprising:
   a base;
   an optical detecting component disposed on the base, the optical detecting component comprising a detecting surface normal vector; and
   a light emitting module disposed on the base, the light emitting module being adapted to output a sampling signal to project onto an external object, and the optical detecting component being adapted to receive the sampling signal reflected from the external object, wherein the light emitting module is slanted toward the optical detecting component to cross an optical axis of spatial distribution of the sampling signal over the detecting surface normal vector and to form a deviated angle, the light emitting module comprising:
   a light emitting unit; and
   an optical modulating component disposed above the light emitting unit and adapted to deviate an emitting direction of the light emitting unit toward the optical detecting component;
   wherein the optical modulating component is a light guiding component, an end of the light guiding component is disposed on the light emitting unit, and the other end the light guiding component is bent toward the optical detecting component.

2. The optical detecting device of the claim 1, wherein the optical modulating component comprises a plurality of micro-prism units, an incident surface of the micro-prism units is a plane facing the light emitting unit.

3. The optical detecting device of the claim 1, wherein the deviated angle of the optical axis relative to the detecting surface normal vector is ranged between 5 degrees and 40 degrees.

4. The optical detecting device of the claim 1, wherein the optical modulating component is adapted to narrow a luminous angle of the light emitting unit.

5. The optical detecting device of the claim 4, wherein the luminous angle of the light emitting unit narrowed by the optical modulating component is substantially ranged between 20 degrees and 90 degrees.

6. The optical detecting device of the claim 1, wherein the light emitting module comprises a supporting component, the light emitting unit is disposed on the supporting component, a supporting surface normal vector of the supporting component is crossed over the detecting surface normal vector.

7. The optical detecting device of the claim 1, further comprising:
   a holding component adapted to obliquely hold the optical detecting component so as to cross the detecting surface normal vector over the optical axis of the light emitting module.

8. The optical detecting device of the claim 1, wherein the base comprises a touch plane, the external object is disposed on the touch plane to reflect the sampling signal, the optical axis is not parallel to a touch plane normal vector of the base and points toward a central region of the touch plane.

9. The optical detecting device of the claim 1, wherein the optical detecting device further comprises more than one light emitting module, the foresaid light emitting modules are respectively disposed on opposite sides of the optical detecting component, optical axes of the foresaid light emitting modules are slanted to each other.

10. An optical detecting device capable of increasing signal-to-noise ratio (SNR) and economizing power consumption to be applied to a wearable device, the optical detecting device comprising:
    a base;
    an optical detecting component disposed on the base, the optical detecting component comprising a detecting surface normal vector; and
    a light emitting module disposed on the base, the light emitting module being adapted to output a sampling signal to project onto an external object, and the optical detecting component being adapted to receive the sampling signal reflected from the external object, wherein the light emitting module is slanted toward the optical detecting component to cross an optical axis of spatial distribution of the sampling signal over the detecting surface normal vector and to form a deviated angle, the light emitting module comprising:
    a light emitting unit; and
    an optical modulating component disposed on the light emitting unit and adapted to deviate an emitting direction of the light emitting unit toward the optical detecting component, the optical modulating component being an asymmetric optical lens as a half of a plano-convex lens and adapted to narrow a luminous angle of the light emitting unit.

11. The optical detecting device of the claim 10, wherein the asymmetric optical lens comprises a lateral surface, an incident surface and an emergent surface, a reflective layer is disposed on the lateral surface.

12. The optical detecting device of the claim 10, wherein the deviated angle of the optical axis relative to the detecting surface normal vector is ranged between 5 degrees and 40 degrees.

13. The optical detecting device of the claim 10, wherein the optical modulating component is adapted to narrow a luminous angle of the light emitting unit.

14. The optical detecting device of the claim 13, wherein the luminous angle of the light emitting unit narrowed by the optical modulating component is substantially ranged between 20 degrees and 90 degrees.

15. The optical detecting device of the claim 10, wherein the light emitting module comprises a supporting component, the light emitting unit is disposed on the supporting component, a supporting surface normal vector of the supporting component is crossed over the detecting surface normal vector.

16. The optical detecting device of the claim 10, further comprising:
   a holding component adapted to obliquely hold the optical detecting component so as to cross the detecting surface normal vector over the optical axis of the light emitting module.

17. The optical detecting device of the claim 10, wherein the base comprises a touch plane, the external object is disposed on the touch plane to reflect the sampling signal, the optical axis is not parallel to a touch plane normal vector of the base and points toward a central region of the touch plane.

18. The optical detecting device of the claim 10, wherein the optical detecting device further comprises more than one light emitting module, the foresaid light emitting modules are respectively disposed on opposite sides of the optical detecting component, optical axes of the foresaid light emitting modules are slanted to each other.

* * * * *